US006968549B1

(12) United States Patent
Harscoet

(10) Patent No.: US 6,968,549 B1
(45) Date of Patent: Nov. 22, 2005

(54) METHOD AND SYSTEM FOR DYNAMICALLY LOADING DATA STRUCTURES INTO MEMORY WITH GLOBAL CONSTANT POOL

(75) Inventor: Philippe Harscoet, Santa Clara, CA (US)

(73) Assignee: Beryl Technical Assays LLC, Las Vegas, NV (US)

( * ) Notice: Subject to any disclaimer, the term of this patent is extended or adjusted under 35 U.S.C. 154(b) by 0 days.

(21) Appl. No.: 09/347,473

(22) Filed: Jul. 2, 1999

(51) Int. Cl.[7] .................................................. G06F 9/45
(52) U.S. Cl. ....................................................... 717/166
(58) Field of Search ................................ 717/166, 148, 717/151; 395/705, 685

(56) References Cited

U.S. PATENT DOCUMENTS

| | | | | | |
|---|---|---|---|---|---|
| 5,784,553 | A | | 7/1998 | Kolawa et al. | |
| 5,815,718 | A | * | 9/1998 | Tock | 717/166 |
| 5,933,635 | A | * | 8/1999 | Holzle et al. | 717/151 |
| 5,966,542 | A | * | 10/1999 | Tock | 717/166 |
| 5,987,256 | A | | 11/1999 | Wu et al. | |
| 5,999,732 | A | * | 12/1999 | Bak et al. | 717/148 |
| 6,047,125 | A | | 4/2000 | Agesen et al. | |
| 6,066,181 | A | | 5/2000 | DeMaster | |
| 6,067,413 | A | * | 5/2000 | Gustafsson et al. | 717/114 |
| 6,081,665 | A | * | 6/2000 | Nilsen et al. | 717/116 |
| 6,083,276 | A | | 7/2000 | Davidson et al. | |
| 6,110,226 | A | | 8/2000 | Bothner | |
| 6,117,185 | A | * | 9/2000 | Schmidt | 717/155 |
| 6,260,187 | B1 | | 7/2001 | Cirne | |
| 6,286,043 | B1 | * | 9/2001 | Cuomo et al. | 709/223 |
| 6,295,638 | B1 | * | 9/2001 | Brown et al. | 717/148 |
| 6,295,643 | B1 | | 9/2001 | Brown et al. | |
| 6,317,869 | B1 | | 11/2001 | Adl-Tabatabai et al. | |
| 6,317,872 | B1 | | 11/2001 | Gee et al. | |
| 6,327,702 | B1 | | 12/2001 | Sauntry et al. | |
| 6,330,709 | B1 | | 12/2001 | Johnson et al. | |
| 6,374,286 | B1 | | 4/2002 | Gee et al. | |
| 6,470,494 | B1 | * | 10/2002 | Chan et al. | 717/166 |
| 6,507,946 | B2 | | 1/2003 | Alexander, III et al. | |
| 6,611,844 | B1 | | 8/2003 | Saulpaugh et al. | |
| 6,760,907 | B2 | | 7/2004 | Shaylor | |
| 6,763,440 | B1 | | 7/2004 | Traversat et al. | |
| 6,792,612 | B1 | * | 9/2004 | Baentsch et al. | 719/331 |

* cited by examiner

*Primary Examiner*—John Chavis

(57) ABSTRACT

A method of operating a computer involving data structures in a set of data structures. As unloaded data structures are needed during runtime, a data structure is received from a first memory. The data structure includes one or more sets of instructions and one or more constants. Instructions from the data structure are stored in a first portion of a second memory, which comprises RAM. Constants from the data structure are stored in a second portion of the second memory if only if the respective constant has not been stored in the second portion of the second memory. Indexes in instructions that reference the constants are modified to correspond to the respective locations of the constants in the second portion of the second memory, and at least some instructions from the data structure are read and executed from the RAM. Also described is a computer system including a memory and logic that, for classes in a set of classes, receives a class from a class file and stores constants from the class in a second portion of the memory if only if the respective constant has not been stored in the second portion of the memory.

23 Claims, 3 Drawing Sheets

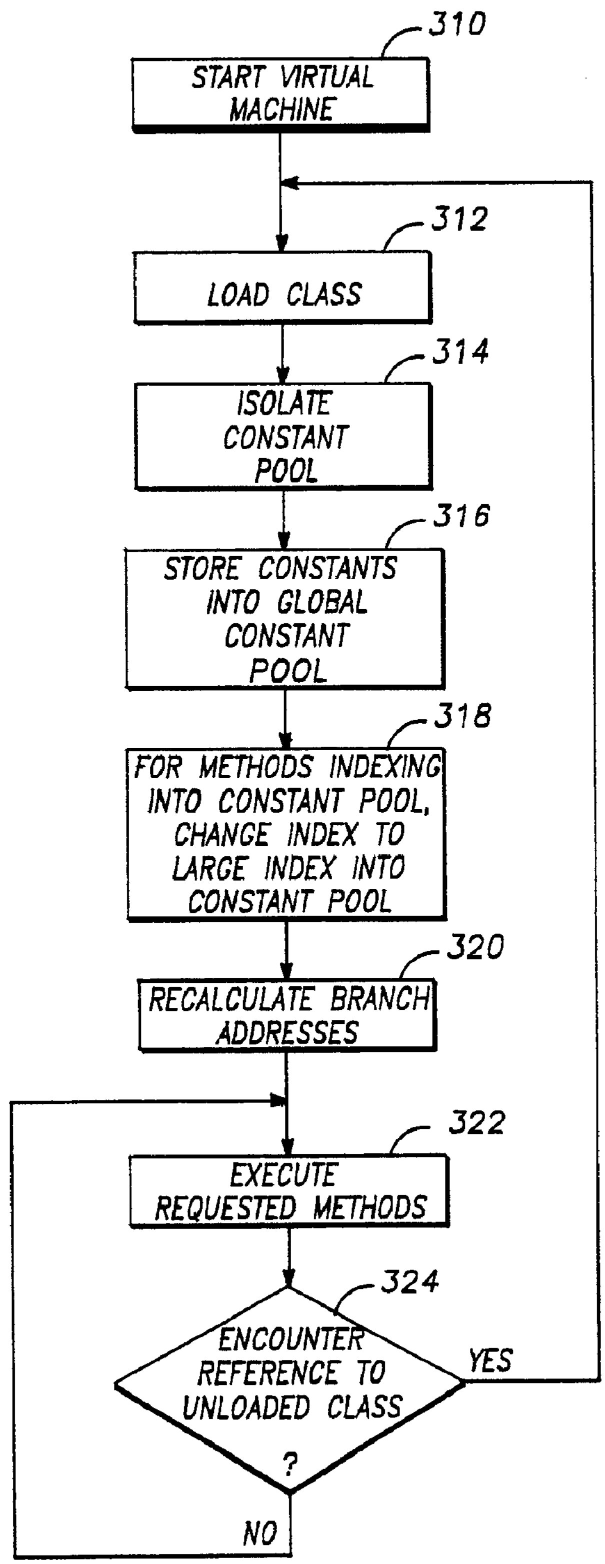
FIG.—3

METHOD AND SYSTEM FOR DYNAMICALLY LOADING DATA STRUCTURES INTO MEMORY WITH GLOBAL CONSTANT POOL

CROSS REFERENCE TO RELATED APPLICATION

This application is related to application Ser. No. 09/347,037, filed Jul. 2, 1999, now abandoned, entitled, *Method and System for Global Constant Management*, which is hereby incorporated herein by reference in its entirety.

BACKGROUND

1. Field of the Invention

The invention relates to loading data structures into memory, in particular to loading data structures including instructions and constants.

2. Description of Related Art

Java is an object oriented programming language, which is often used in a network environment, for example, the Internet. Java's source code is written, and then the source code is compiled into a series of class files. The class files can be stored remotely, for example on a server and then be loaded dynamically when needed on a local system. The class files include bytecode, a set of instructions lower level than the original Java source code, yet higher level than code specific to a particular processor. This helps to allow Java to be particularly suited for the network environment, so that a variety of different local systems can run the Java programs from a network server. Java classes can be distributed to a variety of different systems, as may be connected to the Internet. For example, when encountering a Web page via a browser, a Java application may be initiated, which would involve the Java class files being loaded via the Internet on to the local system.

A local system that runs the Java classes needs functionality to interpret the Java bytecode. One system that provides such functionality is a Java Virtual Machine. The Java Virtual Machine loads the respective classes from the class files and executes methods as needed. The Java Virtual Machine is typically implemented in software, often associated with a browser, but may also be implemented in hardware.

In order to provide useful network applications to a wide variety of systems, it is desirable to be able to run Java applications on small systems that may not have a large amount of memory. Because such systems are small and may not possess excessive memory, it is helpful to conserve the use of memory used by the Java application, in particular the use of random access memory (read-write memory). One approach is to preload classes into memory, loading into read-only memory the methods and data that do not vary, while loading into random access memory varying data and methods. Such an approach is described in U.S. Pat. No. 5,815,718, entitled "*Method And System For Loading Classes In Read-Only Memory*," invented by T. Tock, (hereinafter, "Tock"), which is incorporated herein by reference in its entirety. Classes in Java include typically a number of constants. These constants may require a significant amount of memory on the local system that is running the Java program. The Tock patent indicates that the offline class loader eliminates duplicate constants, in order to combine the constant pools of all the classes in a space efficient manner.

It would be desirable to provide a method and a system which overcome the deficiencies of the prior art.

SUMMARY OF THE INVENTION

Described here is a method of operating a computer involving data structures in a set of data structures. As unloaded data structures are needed during runtime, a data structure is received from a first memory. The data structure includes one or more sets of instructions and one or more constants. Instructions from the data structure are stored in a first portion of a second memory, which comprises RAM. Constants from the data structure are stored in a second portion of the second memory if only if the respective constant has not been stored in the second portion of the second memory. Indexes in instructions that reference the constants are modified to correspond to the respective locations of the constants in the second portion of the second memory, and at least some instructions from the data structure are read and executed from the RAM.

According to one embodiment of the invention, the data structures comprise classes, and the sets of instructions comprise methods. The classes may comprise Java classes and the methods may comprise Java methods. The constants from the data structure may comprise a constant pool of the data structure. Receiving the data structure from a first memory may comprise receiving the data structure from a server over the Internet.

An embodiment of the invention includes, for classes in a set of classes, as unloaded classes are needed during runtime, receiving a class from a class file, the class including one or more methods and one or more constants. Instructions from the class are stored in a first portion of a memory. Constants from the class are stored in a second portion of the memory if only if the respective constant has not been stored in the second portion of the memory. Indexes within methods that reference the constants are modified to correspond to the respective locations of the constants in the second portion of the memory, and at least some instructions are executed from the memory from the class before receiving another class from the class file.

An embodiment of the invention includes a computer system including a memory and first logic that, for classes in a set of classes, receives a class from a class file. The class includes one or more methods and one or more constants. The first logic stores instructions from the class in a first portion of the memory and stores constants from the class in a second portion of the memory if only if the respective constant has not been stored in the second portion of the memory. The first logic modifies indexes within methods that reference the constants to correspond to the respective locations of the constants in the second portion of the memory. The computer system includes second logic that executes methods stored in the memory. The memory, the first logic, and the second logic are coupled locally.

BRIEF DESCRIPTION OF THE DRAWINGS

The invention is illustrated by way of example, and not limitation in the drawings.

FIG. 3 is a flow chart of a method of loading classes into memory and recalculating branch addresses, according to an embodiment of the invention.

DETAILED DESCRIPTION

The following is a description of embodiments of the invention. The embodiments shown help to illustrate the invention. However, it is not intended that the invention be limited to the precise embodiments shown.

Java classes are stored in Java class files. Each class typically includes a constant pool, which contains a set of constants used by the class. Constants from one class are often duplicated in other classes. This duplication can result in a waste of memory if the constants are stored redundantly in the system's memory. The Java Virtual Machine loads classes to be executed from the class files. According to one embodiment of the invention, a global constant pool is created in order to avoid waste of memory for redundantly stored constants. When a class is loaded, the global constant pool is checked to determine whether any of the constants in the class are already in the global constant pool. Such constants are not stored in the constant pool. Constants from the class that are not yet in the global constant pool are stored in the global constant pool. Methods in the class that reference constants in the constant pool of the class are modified so that they reference the correct location in the global constant pool.

Such an approach helps to save memory that would be used by redundant constant entries, in a system where classes are loaded dynamically. For example, a browser used to view a web page may encounter a reference to a Java applet. The browser loads the classes of the applet and dynamically stores the constants of the respective classes into the global constant pool, storing each constant only once. The methods of the applet are modified to reference the global constant pool. Such an approach is particularly advantageous in Java programs because a Java program is often obtained over a network at the time when the program is needed by the local system. In such a situation, the approach described here is advantageous because it does not require preloading of the classes. This embodiment of the invention is also useful even where classes are obtained from a local source, rather than over a network. In such a situation, this approach has the advantage that classes that are not known to the system until after boot time can be stored efficiently in memory.

Figure 1:
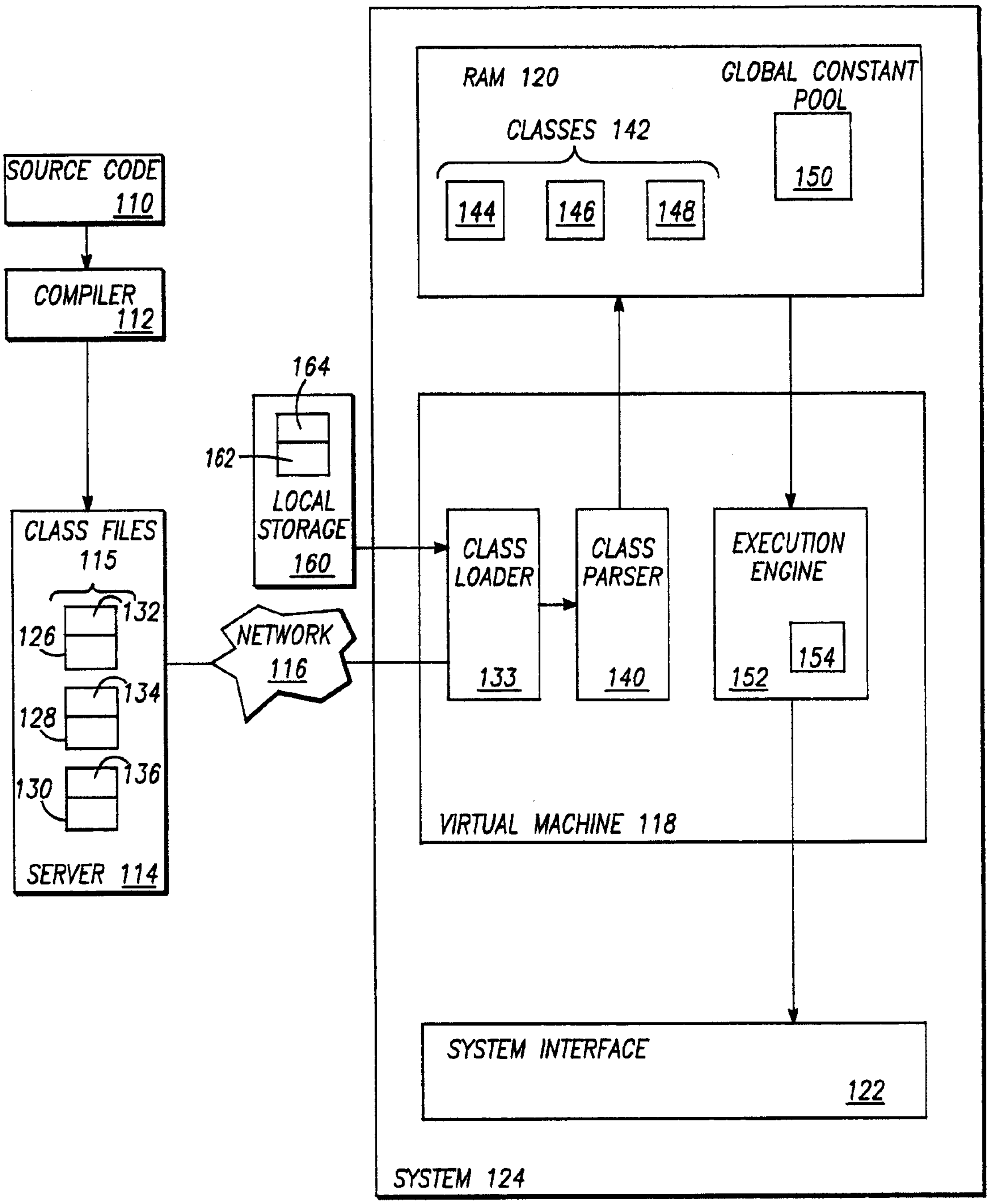
FIG. 1 is block diagram of a virtual machine, memory, and system, according to an embodiment of the invention.

Java is often run dynamically. Java classes are often loaded dynamically as they are needed. This loading may take place even over a network. Thus, the Java virtual machine can access classes from a variety of different locations, including local source, for example, on a hard drive, and from remote sources, for example, from a remote server via the Internet. Instructions are stored as bytecode, and the bytecode is executed by a Java Virtual Machine. The bytecode is lower level code than a high level language that is run by an interpreter, and is higher level than a program compiled into machine code. The design of the Java programming language helps to allow Java to run on a number of different local systems, provided that the local systems have a Java Virtual Machine or equivalent. Thus, Java applications can be distributed widely, for example via the Internet FIG. 1 is block diagram of a virtual machine, memory, and system, according to an embodiment of the invention. Source code 110 is provided to compiler 112. Compiler 112 outputs a set of class files 115 which may be stored on server 114. System 124 receives class files 115 via network 116. System 124 includes virtual machine 118, system interface 122, and RAM 120. RAM 120 includes classes 142 and global constant pool 150. Virtual machine 118 includes class loader 138, class parser 140, and execution engine 152.

Network 116 may comprise the Internet, or other network, such as a LAN or an enterprise network. Virtual machine 118 may be implemented in software, hardware or both hardware and software. Virtual machine 118 may comprise a Java Virtual machine or may comprise another system capable of executing the methods in the classes.

The class files 115 on server 114 include a constant pool for each class. For example, class 126 includes constant pool 132, class 128 includes constant pool 134, and class 130 includes constant pool 136. The constants stored within these constant pools within class files may be redundant between the respective class files. The class files 115 also include methods, which have bytecode instructions. Class loader 133 loads respective class files 115 via network 116. Additionally, local storage 160 may include class files, such class file 162, including constant pool 164. Local storage 160 may comprise flash memory, a hard drive, a CD, other memory device, or a combination of these. Class loader loads class files as they are needed dynamically as virtual machine 118 requires. For example, some class files may be loaded initially, and then, as a reference to another class is encountered during execution of the earlier loaded class files, additional class files are loaded.

Class parser 140 parses through class files and stores the data for the class files into RAM 120. RAM 120 may include the heap, such that classes 142 and global constant pool are stored on the heap. In parsing classes, class parser 140 identifies constants from the respective constant pools of classes. Class parser 140 creates a global constant pool 150 in RAM and stores constants from the respective classes into global constant pool 150. If an entry has already been made for the constant, then it is not stored again into the global constant pool. Classes 142 (144, 146, 148) do not have individual constant pools. Thus, redundancies between constants in respective classes are eliminated through the use of the global constant pool 150. Further, classes are parsed dynamically as they are needed by class parser 140, thus eliminating the need for preloading and parsing the classes. Class parser 140 also modifies indexes within methods that refer to constants. In classes received from class file 115, methods index constants that are included within the constant pool of the respective class. For example, class 126 may have a method that references a constant in its constant pool 132. Now, the index in the method must reference the constant in constant pool 150.

Execution engine 152 supports object oriented code, including the creation of instances and invocation of methods. Execution engine 152 interprets the bytecodes from class 142 as required to execute requested methods. Module 154 in execution engine 152 represents logic in execution engine to support the global constant pool 150. Module 154 causes execution engine to look for constants referenced by methods within classes 142 in the global constant pool 150 rather than in a constant pool of the individual class. Execution engine is coupled to system interface 122, which executes operations requested by execution engine 152. One embodiment, system interface 122 comprises an operating system, which may interface to a file system. And another embodiment to the invention, system interface 122 is simply a file system, so that execution engine 152 is coupled directly to a file system, and the system 124 does not have an operating system. Such a configuration is advantageous where there is a premium on memory. And in this manner, in combination with the use of a global constant pool 150 and lack of an operating system, the need for memory is reduced.

The functionality of the class parser 140 may be combined into class loader 138. In one embodiment of the invention, class loader 138 represents the only class loader in virtual machine 118, and is modified to include the functionality of class parser 140. In such an embodiment, class loader 138 represents the system class loader. In an another embodiment of the invention, class loader 138, combined with the functionality of class parser 140 is a separate instance, and is independent of the system class loader.

According to one embodiment of the invention, a class is parsed immediately after it is loaded. According to another embodiment of the invention, a class is parsed after a series of classes have been loaded by class loader 138.

In one embodiment of the invention, the structure described here may be applicable to data structures other than Java class files. For example, in one embodiment of the invention, data structures other than class files 115 are stored on a server such as server 114. These data structures include instructions and constants. These data structures may also be stored on local storage 160. When these data structures are loaded onto system 124, the instructions portions of the data structures are stored separately in RAM 120 from the constants 150. Duplicate constants are eliminated such that global constant pool 150 only has one instance of each constant. As instructions from respective data structures are executed, the global constant pool is utilized when constants are referenced.

System 124 in one embodiment of the invention is a small appliance that has a minimum of RAM 120. System 124 may comprise a set top box that is coupled to a television, a game console, a web phone, or other small device. Another embodiment to the invention, system 124 comprises a computer system, such as a desktop computer. Other embodiments of system 124 are also possible.

Figure 2:
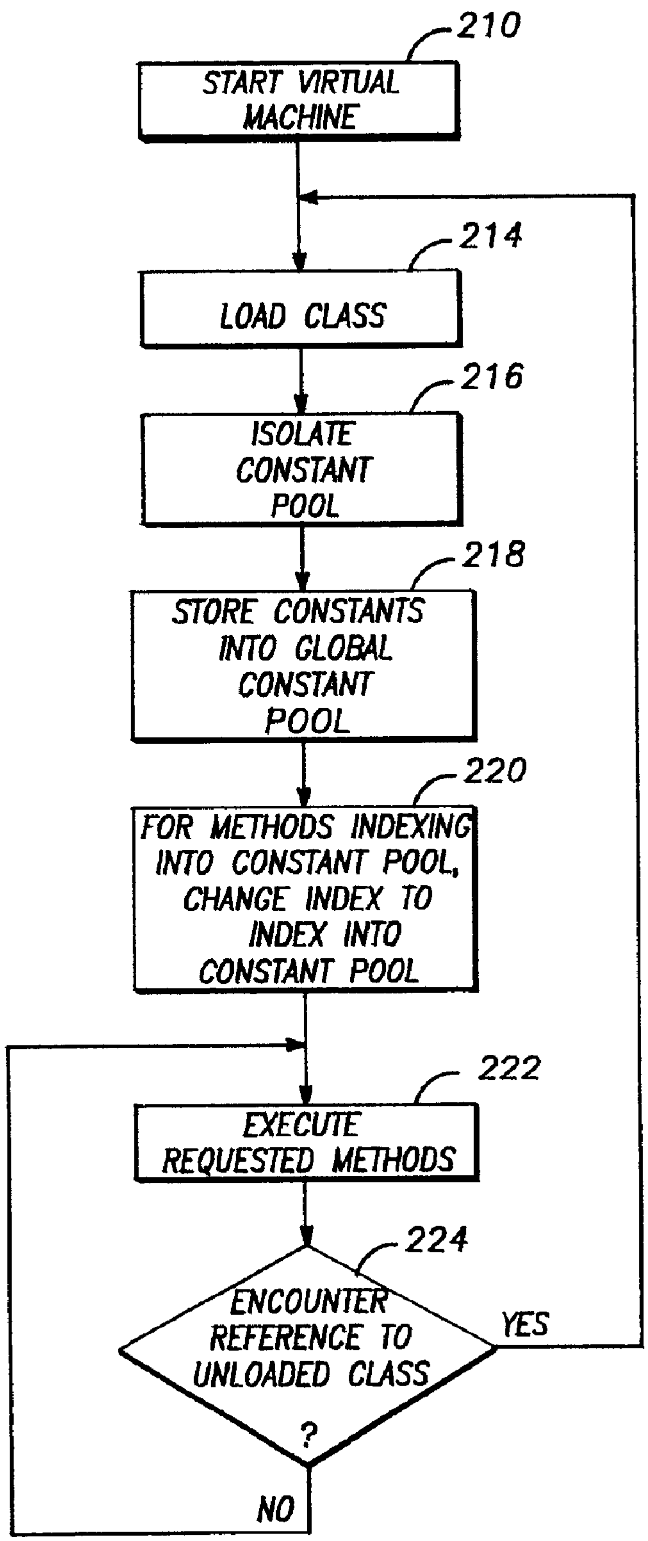
FIG. 2 is a flow chart of a method of loading classes into memory, according to an embodiment of the invention.

FIG. 2 is a flow chart of a method of loading classes into memory, according to an embodiment of the invention. A virtual machine causes classes that were not yet to be loaded and stored into RAM. First the virtual machine is started (block 110). Next, a class is loaded (block 214). The constant pool of the class is isolated (block 216). The constants from the class are stored into the global constant pool (block 218). If a constant is already stored in the global constant pool, then it is not stored again. In this way, space is conserved by avoiding storing duplicate constants in the RAM. An advantage of this approach is that less RAM is needed than would be needed if each class retained its original constant pool.

For methods that index into the constant pool, change the index to an index into the constant pool (block 220). Before the index is changed, members of the constant pool are referenced by an index into the local constant pool of the class. For example, a constant may have an index of '1' in the local constant pool of the class. However, in the global constant pool a number of other constants may have been stored before this particular constant is later stored in the global constant pool. Therefore, the index in the method that references the constant is changed from '1' to properly index into the different global constant pool location. This occurs because a number of constants from various constant pool have been combined into the global constant pool.

Next, execute requested methods (block 222). If when executing a requested method, a reference to an unloaded class is encountered, then repeat the above (block 224). Otherwise, continue executing requested methods (block 222). An advantage of this method is that constants arc stored efficiently in RAM, even in a dynamic environment in which classes are loaded as they are needed by the system. This is a particular advantage when classes are obtained over a network dynamically and one cannot predict which class will be needed for the execution of a particular program, such as a Java applet. For example, an entry in the constant pool may be resolved for the first time when it is used. The resolution includes checking that the item is present in RAM and loading or creating the item if it is not present in RAM. Thus, if the constant pool entry references a class not yet loaded, it can be dynamically loaded and stored in RAM, with the constants being stored into the global constant pool, and methods being modified to index properly into the global constant pool.

FIG. 3 is a flow chart of a method of loading classes into memory and recalculating branch addresses, according to an embodiment of the invention. First the virtual machine is started (block 310). A class is loaded (block 312). The constant pool in the class is isolated (block 314). Constants from the class are stored into the global constant pool (block 316). If a constant is already stored in the global constant pool, a duplicate entry is not made. For methods indexing into the constant pool, the index is changed to a larger index into the constant pool (block 318). With the global constant pool, constants can be shared between different classes. Here the index into the constant pool is a larger index than the index originally present in the method. This is an advantage if a number of methods are loaded into the virtual machine such that the number of constants is larger than the number possible values for the original index in the method. For example, in Java an 8-bit index may be used to reference into the constant pool and may be present in methods loaded from Java classes. The 8-bit index may be replaced with a 16-bit index in order to allow for a large number of entries in the global constant pool. This change in the size of the index will cause the locations of subsequent bytecode to change. Therefore, branch addresses are recalculated (block 320). For example a branch address may be pointing to an address that was previously used by a bytecode, which is now shifted downward because of the larger indexes now present in the code.

For example, if a branch appears before the shift, the branch value has to reflect the shift as well. Here is the code before the modification:

10 branch 14
12 ldc 1 ←8 bit index
14 . . .

after relocating the index, it should become like this:

10 branch 15
12 ldcw 0x1234 ←16 bit index

Thus branch 14 needs to be changed because the location to which it is pointing now contains the second byte of the 16 bit index.

Entries in the exception table are changed to reflect relocation bytecodes due to the use of a larger index. Offsets are adjusted with respect to the new locations of the respective bytecodes.

Next, execute requested methods (block 322). If a reference to an unloaded class is encountered (block 324), then return to loading the class (block 312). Thus, constants are dynamically stored in the global constant pool as classes are dynamically loaded from a class file.

The methods and systems described above also apply in applications other than Java classes. For example, these methods and systems may be applicable to computer systems using other object oriented programming schemes. Alternately, these methods and systems may more generally be applied to the loading of data structures from memory, where the data structures include instructions and constants.

Various embodiments of the invention have been illustrated in the figures and have been described in the corresponding text of this application. This foregoing description is not intended to limit the invention to the precise forms disclosed. Rather, invention is to be construed to the full extent allowed by the following claims and their equivalents.

What is claimed is:

1. A method of operating a computer, the method comprising:

for data structures in a set of data structures, as unloaded data structures are needed during runtime, receiving a data structure from a first memory, the data structure including one or more sets of instructions and one or more constants;

storing instructions from the data structure in a first portion of a second memory, the second memory comprising RAM;

storing constants from the data structure in a second portion of the second memory if and only if the respective constant has not been stored in the second portion of the second memory, modifying indexes in instructions that reference the constants to correspond to the respective locations of the constants in the second portion of the second memory, and reading and executing at least some instructions from the data structure from the RAM.

2. The method of claim 1, wherein the data structures comprise classes.

3. The method of claim 1, wherein the data structures comprise classes of an object-oriented computer language that uses bytecode.

4. The method of claim 1, wherein the sets of instructions comprise methods.

5. The method of claim 1, wherein the sets of instructions comprise methods of an object-oriented computer language that uses bytecode.

6. The method of claim 1, wherein the constants from the data structure comprise a constant pool.

7. The method of claim 1, wherein receiving the data structure from a first memory comprises receiving the data structure from a server over the Internet.

8. The method of claim 1, wherein modifying indexes in instructions includes replacing respective indexes with larger indexes and wherein the method further includes calculating addresses associated with branch instructions.

9. A method of operating a computer, the method comprising:

for classes in a set of classes, as unloaded classes are needed during runtime, receiving a class from a class file, the class including one or more methods and one or more constants:

storing instructions from the class in a first portion of a memory, storing constants from the class in a second portion of the memory if and only if the respective constant has not been stored in the second portion of the memory, modifying indexes within methods that reference the constants to correspond to the respective locations of the constants in the second portion of the memory, and executing from the memory at least some instructions from the class before receiving another class from the class file.

10. The method of claim 9, wherein the classes comprise classes of an object-oriented computer language that uses bytecode.

11. The method of claim 9, wherein the memory comprises RAM.

12. The method of claim 9, wherein receiving the class from a class file comprises receiving the class from a server over the Internet.

13. The method of claim 9, wherein modifying indexes within methods includes replacing respective indexes with larger indexes and wherein the method further includes calculating addresses associated with brunch instructions.

14. The method of claim 13, wherein the respective indexes each comprise 8 bits and the larger indexes each comprise 16 bits.

15. The method of claim 9, wherein the constants comprise strings.

16. A computer system comprising:

a memory;

a virtual machine;

first logic that, after the virtual machine has been started, for classes in a set of classes, receives a class from a class file, the class including one or more methods and one or more constants;

stores instructions from the class in a first portion of the memory;

stores constants from the class in a second portion of the memory if and only if the respective constant has not been stored in the second portion of the memory, and modifies indexes within methods that reference the constants to correspond to the respective locations of the constants in the second portion of the memory; and second logic that executes methods stored in the memory;

wherein the memory, the first logic, and the second logic are coupled locally.

17. The computer system of claim 16, wherein the classes comprise classes of an object-oriented computer language that uses bytecode.

18. The computer system of claim 16, wherein the constants from the class comprise a constant pool of the data structure.

19. The computer system of claim 16, wherein the memory comprises RAM.

20. The computer system of claim 16, wherein receiving the class from a class file comprises receiving the class from a server over the Internet.

21. The computer system of claim 16, wherein modifying indexes within methods includes replacing respective indexes with larger indexes and wherein the method further includes calculating addresses associated with branch instructions.

22. The computer system of claim 21, wherein the respective indexes each comprise 8 bits and the larger indexes each comprise 16 bits.

23. The computer system of claim 16, wherein the first and second logic comprises computer readable code means loaded into a RAM.

* * * * *